United States Patent [19]
Martin

[11] Patent Number: 6,150,488
[45] Date of Patent: Nov. 21, 2000

[54] PROCESS FOR PREPARING SILANOL-FUNCTIONAL SPECIFICALLY BRANCHED ORGANOPOLYSILOXANES AND PRODUCTS PRODUCED THEREBY

[75] Inventor: Eugene R. Martin, Onsted, Mich.

[73] Assignee: Wacker Silicones Corporation, Adrian, Mich.

[21] Appl. No.: 09/222,982

[22] Filed: Dec. 30, 1998

[51] Int. Cl.[7] ............................ C08K 77/08; C08K 77/14
[52] U.S. Cl. ................... 528/34; 528/14; 528/12; 528/33; 528/39; 556/434
[58] Field of Search .................. 528/14, 12, 33, 528/34, 39; 556/434

[56] References Cited

U.S. PATENT DOCUMENTS

| | | | |
|---|---|---|---|
| 4,456,293 | 6/1984 | Panissidi . | |
| 5,254,658 | 10/1993 | Ogawa et al. | 528/37 |
| 5,256,741 | 10/1993 | Ogawa et al. | 525/477 |
| 5,272,225 | 12/1993 | Ogawa et al. | 525/477 |
| 5,581,008 | 12/1996 | Kobayashi | 556/434 |
| 5,661,215 | 8/1997 | Gee et al. . | |
| 5,773,548 | 6/1998 | Schickmann et al. | 528/18 |

FOREIGN PATENT DOCUMENTS

| | | |
|---|---|---|
| 0 033 891 A1 | 8/1981 | European Pat. Off. . |
| 0 589 440 A2 | 3/1994 | European Pat. Off. . |
| 0 755 959 A2 | 1/1997 | European Pat. Off. . |

*Primary Examiner*—Robert Dawson
*Assistant Examiner*—Kuo-Liang Peng
*Attorney, Agent, or Firm*—Brooks & Kushman P.C.

[57] ABSTRACT

Star- and comb-type branched organosilicon compounds containing ω-terminated organopolysiloxane branches are readily synthesized by the catalyzed or uncatalyzed reaction of an at least tris(organyloxy)-functional organosilicon compound with a predetermined amount of substantially linear minimally disilanol-functional organopolysiloxane. Well defined, non-resinous, liquid products of low viscosity may be obtained.

19 Claims, No Drawings

PROCESS FOR PREPARING SILANOL-FUNCTIONAL SPECIFICALLY BRANCHED ORGANOPOLYSILOXANES AND PRODUCTS PRODUCED THEREBY

TECHNICAL FIELD

The present invention is directed to the field of branched, silanol-functional organopolysiloxanes. More particularly, the present invention is directed to processes for preparing silanol-functional, branched organopolysiloxanes having a high degree of specificity in their structure.

BACKGROUND ART

Silanol-functional, branched organopolysiloxanes have numerous uses, for example as release coatings, and as curable and/or crosslinkable components in silicone compositions, such as organopolysiloxane coatings and elastomers.

Silanol-functional, branched organopolysiloxanes, which are predominately liquids, should not be confused with highly crosslinked organopolysiloxane resins, such as the well known MQ resins, which are generally of relatively high molecular weight, highly three-dimensionally and randomly cross-linked systems. Rather, silanol-functional, branched organopolysiloxanes are substantially star-like or comb-like polymers having, in general, rather lengthy silanol-functional and substantially linear organopolysiloxane chains emanating from a limited number of branching points.

The synthesis of such star- or comb-like polymers has been fraught with difficulty. For example, as recently as 1993, in U.S. Pat. No. 5,256,741, it is reported that there had been no reports of any star-type organopolysiloxanes having an $SiO_{4/2}$ group as the branch center, and bonded at this branch center to one end of diorganopolysiloxane components. In the '741 patent, branched, but highly crosslinked organopolysiloxanes were prepared by treating organopolysiloxane resins containing chlorosilane moieties with n-butyl lithium, followed by reaction with a cyclic diorganopolysiloxane in ring-opening polymerization.

However, both the starting materials and end products of the '741 patent are poorly defined. The products are generally highly three dimensionally crosslinked resinous solids with a limited number of relatively long diorganopolysiloxane chains bonded to this highly crosslinked structure. Ratios of long chain diorganopolysiloxane moieties to $SiO_{4/2}$ crosslinking/branching sites is limited to approximately 1:1; for example $(SiO_{4/2})_{22} (Me_2ASiO_{1/2})_{20}$, where A represents a linear, n-butyl, methyl, vinyl siloxy-terminated polydimethylsiloxane containing 180 repeating dimethylsiloxy units. Such products have limited usefulness. Their method of preparation is quite expensive, and employs spontaneously flammable reactants such as n-butyl lithium. Silanol-functional products are said to be obtainable only in the presence of basic trapping agents for the HCl generated in the process.

In U.S. Pat. No. 5,254,658, silanol-functional MQ resins are dissolved in solvent and converted to silanolates with n-butyl lithium. These compounds are then reacted with cyclic organopolysiloxanes in ring-opening polymerization to form linear organopolysiloxane chains at the silanolate sites, the reaction stopped by adding end-blocking triorganohalosilanes such as dimethylvinylchlorosilane. Stopping the reaction with a protic acid results in silanol-functional chains. As with the '741 patent, the products are best described as MQ resin "nuclei" or "clusters" functionalized with long organopolysiloxane chains rather than true "star" or "comb" polymers. The products, being solids, have only limited usefulness. When used in release coatings, for example, the products cannot be used neat, but must be dissolved in solvent or other liquid components.

It would be desirable to prepare silanol-functional star- and comb-type polyorganosiloxanes with well defined structures which may, if desired, be substantially free of three-dimensionally cross-linked "nuclei" or "clusters"; which may be prepared as liquids, allowing use neat; and which may be prepared simply and without resort to dangerous reagents such as alkali metal alkyls.

DISCLOSURE OF INVENTION

Star- and comb-like branched, polyorganosilanol-functional organopolysiloxanes can be prepared with great specificity in relation to intended structures and in high yield, by the catalyzed or uncatalyzed reaction of minimally disilanol-functional organopolysiloxanes with silanes, silalkylenes, and/or siloxanes bearing multiple organyloxy groups reactive with silanol groups. By selection of reaction conditions and reactant molar ratios, molecular weight, number of branches, and average silanol functionality and other molecular parameters may be adjusted over a wide range.

DESCRIPTION OF PREFERRED EMBODIMENTS

The branched, silanol-functional organopolysiloxanes of the subject invention are prepared by reaction of minimally disilanol-functional organopolysiloxanes with organyloxy-functional silanes, silalkylenes, and siloxanes, and their oligomers and polymers.

The minimally disilanol-functional organosiloxanes may be selected from a wide range of organosiloxanes, but are preferably α,ω-dihydroxypolydiorganosiloxanes corresponding to the formula

(I)

wherein R is a a $C_{1-18}$ saturated hydrocarbon, preferably an alkyl group, optionally interspersed with heteroatom linking groups such as, but not limited to —O—, —S—, —NH—, —NR$^2$—,

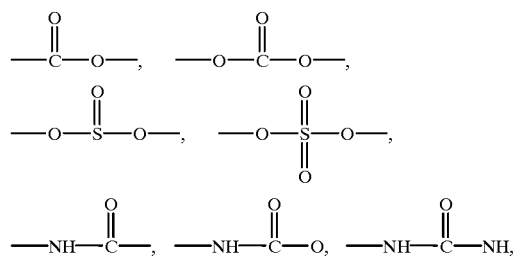

and the like, where $R^2$ is a $C_{1-18}$ alkyl group, a $C_{5-12}$ cycloalkyl group, or $C_{6-20}$ aryl, alkaryl, or aralkyl group, all these alkyl, cycloalkyl, alkaryl, aryl, and aralkyl groups optionally substituted by carbon-bonded halo, alkoxy, cyano, hydroxy or other functional groups which are unreactive with Si-bonded organyloxy groups or which are reactive with such groups to a lesser extent than silanol-functionally such that reaction of the minimally disilanol-functional organopolysiloxanes with the organyloxy-functional silanes, siloxanes, etc., is not substantially altered. R is preferably $C_{1-18}$ alkyl or aryl, and more preferably methyl, ethyl, or phenyl;

$R^1$ is a $C_{2-20}$ unsaturated hydrocarbon, preferably alkenyl or cycloalkenyl, more preferably vinyl, allyl, or propenyl;

a is 0, 1, or 2, preferably 1 or 2, most preferably 2; and
b is 0, 1, or 2, preferably 0 or 1, most preferably 0.

Most preferably, the minimally disilanol-functional organopolysiloxanes are α,ω-dihydroxypolydimethylsiloxanes.

The minimally disilanol-functional organopolysiloxanes may also have three or more silanol functionalities, but this is not preferred. Additional silanol functionality may be obtained by including, in Formula I, moieties of the formula

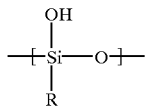

where R has the meaning given previously, or by adding silanol-terminated organopolysiloxane branches, for example by including in formula I moieties of the formula

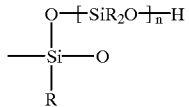

(T units), or of the formula

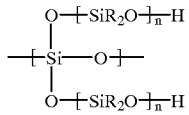

(Q units). Preferably, such silanol-functional T and Q units are present in less than 5 mol percent based on the remaining siloxy repeating units of the minimally difunctional organopolysiloxane. If present in greater amounts, the specificity of the product may suffer, and it may be impossible to prepare liquid products, particularly liquid products of low viscosity. The value of n in these moieties should be considered together with n of formula (I) in determining the molecular weight of the minimally disilanol-functional organopolysiloxane.

The minimally difunctional organopolysiloxanes may, however, contain non-silanol functional branches derived from $RSiO_{3/2}$ mono-organosiloxy (T) units and $SiO_{4/2}$ (Q) units, for example those units which are bonded at their branching sites to triorganosiloxy-terminated polyorganosiloxane chains.

The molecular weight of the minimally disilanol-functional organopolysiloxanes, and the values of n, the number of repeating siloxy units, can vary considerably. However, n must be minimally 6, and is preferably from 10 to about 10,000, more preferably 50 to about 1000, and most preferably in the range of about 75 to about 500. For α,ω-dihydroxypolydimethylsiloxanes, the range of viscosities which are useful is from 10 cSt to about 1,000,000 cSt, more preferably 50 cSt to about 100,000 cSt.

The organyloxy reactant will have greater than 2 organyloxy groups per molecule on average which are reactive with silanol functionality. The organyloxy groups are those having the formula —O—$R^4$, which is bound by its free oxygen valence directly to silicon, where $R^4$ is an organic group which provides the requisite degree of reactivity for the organyloxy group. Preferably, $R^4$ is $C_{1-4}$ lower alkyl or $C_{1-19}$ acyl:

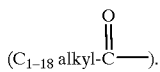

The organyloxy group may be described as an "organic leaving group", although this designation is only descriptive, and not limiting. For example, the silicon-bound oxygen of the organyloxy group may remain bound to silicon or may remain bound to the organyl group following reaction. In either case, however, during the course of the reaction, H—O—$R^4$ groups or their reaction medium-derivatized equivalents will be generated. For example, when —O—$R^4$ is a methoxy group, methyl alcohol will be formed, while when —O—$R^4$ is

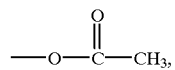

acetic acid will be formed. It is important that the organic leaving group does not form a species which catalyzes the condensation of silanol groups to the extent that silanol condensation is favored over organyloxy/silanol condensation.

Preferred organyloxy groups are methoxy, ethoxy, acetoxy, and propionoyl

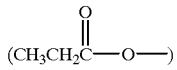

groups, most preferably methoxy and acetoxy groups. Mixed groups, i.e., methoxy and acetoxy are also useful.

The organyloxy-bearing substrate will be a silane, silalkylene, or siloxane, or their oligomers and/or polymers, alone or in admixture. Preferably, the organyloxy-functional compound is a silane or oligomeric, low molecular weight polysiloxane or silalkylene. Such organyloxy-functional organosilicon compounds can provide a diverse array of star-type polymers.

Preferred reactants belonging to this class are $Si(OR^4)_4$, $RSi(OR^4)_3$, $(R^4O)_3Si—O—Si(OR^4)_3$, $R_3Si—O—Si(OR^4)_3$, $R(R^4O)_2Si—O—Si(OR^4)_2R$, $R(R^4O)_2Si—O—Si(OR^4)_3$, $R(R^4O)_2Si—R^5—Si(OR^4)_2R$, $(R^4O)_3Si—R^5—Si(OR^4)_3$, and like compounds, wherein $R^5$ is an alkylene, arylene, cycloalkylene, alkarylene or aralkylene linking group of 1 to 30 carbon atoms, optionally interspersed with reaction stable heteroatom linking groups such as those described previously, particularly —O—. The $R^5$ linking groups in the silalkylene and silarylene moieties may also be replaced by $R^6$ groups having the formula —$R^5$—O—, —O—$R^5$—O, provided that these linkages are sufficiently unreactive under the reaction conditions so as to avoid cleavage (hydrolysis) at these points, and will not serve as a leaving group by reaction with silanol groups. Most preferably, the organyloxy substrates contain no $R^6$ linking groups.

The organosilicon organyloxy-functional substrates may also be linear or branched polyorganosiloxanes containing terminal organo bis(organyloxy) siloxy

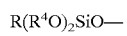

and tris(organyloxy) siloxy $(R^4O)_3$—Si—O groups. The remainder of the molecule may be a linear polyorganosiloxane such as one of the formula $\{SiR_2\text{—}O\}_m$ or a branched organopolysiloxane containing any variety and number of M ($R_3SiO_{1/2}$), D ($R_2SiO_{2/2}$), T ($RSiO_{3/2}$), and Q ($SiO_{4/2}$) units, where the R groups may be R groups as previously defined, or $R^1$ groups as previously defined, provided that the molecules contain minimally three accessible organyloxy-functional groups.

The organyloxy-functional compounds may also be resinous, i.e., contain sufficient T and Q moieties so as to form three dimensionally crosslinked "clusters", provided these have minimally three reaction-accessible organyloxy groups. However, such resinous starting materials are not preferred. It is most preferred that the organyloxy-functional silicon compounds be linear, or contain less than four Q-unit branches, preferably less than 3 of such branches. The organyloxy-functional silicone compounds may also contain T-unit derived branches, preferably not more than 10, preferably less than 5, and more preferably 3 or less. A "branch" in the sense meant here is exclusive of T or Q moieties bearing reactive organyloxy groups.

Most preferred organyloxy starting materials are methyltrimethoxysilane, bis(methyldimethyloxy)disiloxane (Me(MeO)$_2$Si—O—Si—(OMe)$_2$Me), bis(trimethoxyldisiloxane) ((MeO)$_3$Si—O—Si(OMe)$_3$), methyltriacetoxysilane, and like compounds. Also preferred are α,ω-bis(dimethoxy or trimethoxy)polydimethylsiloxanes, particularly oligomers having less than 20 dimethylsiloxane repeating units, and α-trimethoxy-ω-trimethyl-polydimethylsiloxanes.

The reaction between the minimally disilanol-functional organopolysiloxane and the organyloxy-functional organosilicon compound may take place neat, in the absence of solvents; or in the presence of solvents which do not affect the specificity of the reaction. In the case of resinous organyloxy-functional organosilicon compounds, which are generally solids, solvents such as toluene or xylene, and in some cases paraffinic solvents, must be employed. In the case where reactants are of very high viscosity, addition of solvents may also be useful. Suitable solvents are those unreactive with silanol groups and unreactive with organyloxy groups. In general, protic solvents such as alcohols are preferably avoided.

The reaction may be catalyzed or uncatalyzed. Suitable catalysts are those which accelerate the reaction between organyloxy and silanol groups but which do not markedly accelerate the condensation of silanol groups, or catalyze the latter reaction to a much lesser extent than organyloxy/silanol condensation. Strongly acid catalysts and strongly basic catalysts cannot be used. Examples of the former are hydrochloric and sulfuric acids, trichloroacetic acid, etc., while examples of the latter are alkali metals (which form silanolates with generation of hydrogen or other species), alkali metal hydroxides, alkali metal silanolates, alkali metal alkyls such as n-butyl lithium, and the like.

To test a potential catalyst, first the effect of the catalyst on silanol co-condensation is assessed. A suitable catalyst candidate will change the silanol content (as measured by conventional methods, including NMR) of the minimally disilanol-functional organopolysiloxane by not more than 25% under the desired reaction conditions (temperature, pressure, time, presence/absence of solvents, etc.). This test is very expedient and merely involves heating (or maintaining, cooling, etc.) the silanol with the desired amount of proposed catalyst and measuring silanol content and/or viscosity. A marked change in viscosity generally occurs when a catalyst is not acceptable. This occurs, for example, when hydrochloric acid or alkali metal hydroxides are used. Since the subject process is advantageously conducted at standard pressure, tests under these conditions generally suffice to identify successful catalyst candidates.

A preferred catalyst is acetic acid. Other carboxylic acids may also be used, as well as other organic compounds having low but measurable acidity. The choice of catalyst is not limited, however, and catalysts which are slightly basic, or which exhibit no acid/base behavior whatever may be useful as well.

Once a candidate catalyst is identified, it must be determined whether the catalyst is effective to accelerate the reaction between organyloxy groups and silanol groups, again under the desired reaction conditions. This reaction may be monitored by disappearance of organyloxy groups or silanol groups, by collection of volatile leaving group-derived compound (i.e. methanol for methoxy organyloxy groups), or similar methods. If a proposed catalyst fails to markedly accelerate silanol co-condensation but does accelerate reaction between organyloxy and silanol groups, then the catalyst is useful for practice of the present invention. Such a catalyst, which accelerates the organyloxy/silanol reaction to a much greater extent than silanol co-condensation according to the manner described heretofore, may be termed a "differential catalyst" herein.

Reactant molar ratios play an important role in adjusting the product branching and silanol content. It has been unexpectedly discovered that in reaction mixtures containing multiple organyloxy-functional organosilicon compounds and minimally disilanol-functional organopolysiloxanes, that the extensive crosslinking and polymerization by chain extension which one would expect does not occur. Thus, rather than each terminus of an α,ω-dihydroxylpolyorganosiloxane reacting, causing chain extension and accompanying large increases in viscosity and molecular weight, apparently only one terminus of each silanol-functional organopolysiloxane generally reacts. This is particularly surprising in view of the relatively large numbers of organyloxy branching sites available per organyloxy-functional molecule. One would expect highly viscous, three dimensionally crosslinked, resinous compositions from such mixtures. Rather, one obtains star- and comb-like polymers of low viscosity, and only a small amount of intermolecular linking or chain extension.

For example, in the reaction of one mol methyltrimethoxysilane (trifunctional) with three mols α,ω-dihydroxydimethylsiloxane (difunctional), one would expect a wide variety of reaction products, with a large quantity of both linearly and three-dimensionally crosslinked species. However, one instead obtains a composition containing in excess of 75 mol percent of star-like, silanol-functional, branched compounds corresponding to the structure:

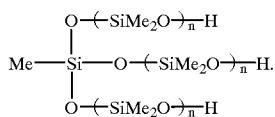

Because of the relatively high degree of specificity, the structures of the products of the subject process can be predetermined. By "predetermined" is meant that the final silanol content will be within 75 mol percent to 125 mol percent of the intended silanol content, and the number of branching sites is at least about 75% of the intended number of branching sites. The intended silanol content and branch content can be predicted beforehand, and the final structures can be largely predicted as well. In the discussion which follows, it is desired that each at least disilanol-functional organopolysiloxane will react only once with each organyloxy functionality, creating a silanol-terminated organopolysiloxane branch at that point, except when product molecules containing two or more organyloxy-functional derived moieties are contemplated. Both the branch points as well as the silanol content can easily be measured.

For example, with a tris(organyloxy)-functional organosilicon compound, where it is desired to produce a star-polymer having three equal, silanol-terminated organopolysiloxane branches, one mol of organyloxy-functional organosilicon compound is preferably reacted with 3 mol of α,ω-dihydroxyorganopolysiloxane. Obtained from the reaction will be a star polymer, the predominate population of molecules of which will be the desired tri-branched and tri-silanol functional product. Small quantities of chain-extended, crosslinked, and co-condensed silanols may also be present. However, the amounts of such products will be small. A small portion of organyloxy groups and disilanols may also remain unreacted. The amounts of unreacted functional groups may be decreased by extending reaction time, increasing reaction temperature, and/or employing a suitable catalyst. This feature may be useful in tailoring specific degrees of branching, functionality, viscosity, etc., into the product. Thus, product mixtures may, in general, be "overreacted", with lower than theoretical silanol content, or may be "underreacted," with higher than theoretical silanol content, the "theoretical" content being that predicted based on the intended outcome. For example, reaction of methyltrimethoxysilane and α,ω-dihydroxypolydimethylsiloxane in a 1:3 molar ratio should, in the absence of crosslinking, yield a product with 0.0014 weight percent T moieties (branch sites) and 0.109 weight percent silanol functionality. The actual values (note Example 1) are 0.001224% and 0.12%, respectively, giving an 87.4% of theory of branch sites, and 110% of theory of silanol functionality.

As a further example, if the same organyloxy compound is used, but a compound with more than 3 silanol-terminated branches is to be obtained, 2 mols of tris(organyloxy)-functional organosilicon compound may be reacted with 5 mols of disilanol. Because the disilanol/organyloxy ratio is less than 3:1, if the reaction is carried substantially to completion, a product having more theoretical branching points and some intermolecular linking is obtained. A predominant species may be, for example:

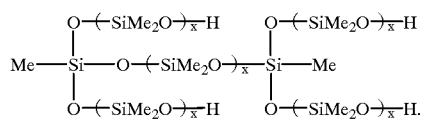

As a further example, an organyloxy functional silanol having the formula

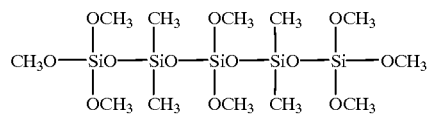

can be reacted with 8 mols of disilanol to produce a product with eight theoretical branch points and 8 mols of silanol functionality.

The number of mols of disilanol necessary to react with a given amount of organyloxy-functional organosilicon compound may be calculated as follows. If the organyloxy content per molecule is y, and the intended structure contains x organyloxy-functional reactant molecules per product molecule, then the number of mols L of disilanol may be calculated from the equation $$L=(y-1)x+1$$

In the above equation, y may range, for example, from a minimum of 2.5 corresponding to a mixture of molecules at least a portion of which have greater than three organyloxy groups, but is preferably 3.0 or greater. When mixtures of molecules or somewhat ill-defined starting mixtures are used, the organyloxy content can be calculated from the average molecular weight and the mols of organyloxy groups. However, since a benefit of the subject invention is to produce well defined products, it is preferable to begin the reaction with well defined starting materials as well. These starting materials generally have a specific, generally integral organyloxy-group content per molecule of 3, 4, 5 or higher.

In the above formula, x is the number of mols of the organyloxy-functional compound which is desired to be present in each molecule of product. In general, x is a relatively small number, for example 2 or 3, but may be higher as desired. Lower values tend to result in liquid products of greater intrinsic uniformity.

For example, when employing a three-functional starting molecule such as methyltriacetoxysilane, if one organyloxy compound per product molecule is desired, yielding three branch sites, the number of mols of disilanol, L which are required for the number of mols of organyloxy compound, will be calculated as $$L=(y-1)(x)+1; L=2x+1; L=2(1)+1;$$

$$L=3 \text{ mols disilanol,}$$

while if 2 moieties (2 mol) derived from the tri-functional starter are desired to be present in the product molecules, the calculation is:

$$L=(y-1)(x)+1; L=2x+1; L=2(2)+1;$$

and thus L=5 mols of disilanol per 2 mols of organyloxy-functional organosilicon compound.

If a four-functional organyloxy compound is used, and three of these molecules are desired in the product, the calculation becomes:

$$L=(y-1)(x)+1; L=3x+1; L=3(3)+1;$$

and thus L=10 mols of disilanol per 3 mols of organyloxy-functional organosilicon compound.

Since in practice, generally only one silanol group of the minimally disilanol-functional compound reacts, the same calculation may be used when the silanol-functional reactant contains more than two silanol groups. However, it should be noted that for maximum product specificity, it is preferred that the silanol-functional moiety be difunctional only.

From the foregoing, it can be seen that the product make-up and therefore the number of branch sites and resulting silanol functionality may be adjusted by altering the ratio of silanol compound to organyloxy compound. The process has yet greater flexibility, however, since it is possible to alter the degree of completion of the reaction to further adjust the degree of branching, silanol content, viscosity, etc. Preferably, the molar ratio of retained silanol functionality to the number of mols of branched groups, M, is within the range of (a)·(b/c), where a is from about 0.75 to about 1.6, b is the actual number of mols of silanol per gram of branched, silanol-functional product, and c is the measured number of mols of branched groups in the product.

The range of 0.75 to 1.6 may be viewed as reflecting the degree of completion of the reaction, and to some degree the amount of intermolecular crosslinking obtained over and above the amount calculated from the mol ratios of starting components. Thus, when a >1, excess silanol functionality is present. This excess silanol is preferably an amount which has remained unreacted based on the amount calculated to be necessary to produce the targeted product. However, when the targeted product is intended to contain only one organyloxy-functional starting material-derived moiety per product molecule, the excess silanol may have been purposefully added, and despite substantial completion of the reaction, will remain in the product mixture. The product will then consist of both the desired silanol-functional branched organopolysiloxane, but also will contain linear disilanol-functional organopolysiloxane as well. When a is <1, the reaction has generally gone too far, and has possibly resulted in co-condensation of silanol-functional moieties, including both disilanol-functional organopolysiloxane and branched silanol-functional product or intermediate product. This situation may occur when an organyloxy group of insufficient reactivity is employed, or a catalyst which also too efficiently catalyzes co-condensation of silanol groups is employed.

Additional flexibility of the subject process may be illustrated by the one pot preparation of curable mixtures containing both highly branched silanols and lesser branched or linear silanol-functional species. For example, a tris (organyloxy)silane may be reacted with α,ω-dihydroxyorganopolysiloxane in a mol ratio of 2:5 to obtain a product mixture containing predominantly star polymers containing four silanol-functional branches. At the completion of the reaction, all organyloxy groups having reacted, additional quantities of the same or different α,ω-dihydroxyorganopolysiloxane may be added. The resulting composition, when cured to an elastomer, will exhibit less hardness and expectedly greater elongation than an elastomer prepared only from the four-functional star polymer.

Thus, the subject process is preferably one for preparing branched organosilicon compounds having minimally three branches, the branches comprising substantially linear, silanol-terminated organopolysiloxane polymers containing six or more siloxy moieties, said process comprising: a) selecting one or more organyloxy-functional organosilicon compounds having, on average, y organyloxy groups per molecule; b) reacting with the organyloxy-functional silicon compounds a) L/x mol of one or more minimally disilanol-functional organopolysiloxanes per mol of organyloxy-functional compound, where x is the desired number of organyloxy-functional organosilicon compound-derived moieties in the branched organosilicon compound product, and L=(y−1)x+1; c) obtaining a product mixture comprising in major part star- and/or comb-branched product organopolysiloxanes having a functionality of silanol-terminated branches of 2L−yx.

COMPARISON EXAMPLE 1

A linear OH terminated dimethylpolysiloxane, having a viscosity of about 556 cSt and a silanol content of 0.22 weight percent represented by the formula

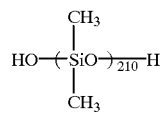

is heated six hours at 150° C. and the resultant product is heated two hours at 175° C. at less than 1 torr. The resultant product has a silanol content of 0.2 weight percent. This example shows that the OH terminated fluid is stable at reaction conditions used to make the silanol terminated branched dimethylpolysiloxane.

COMPARISON EXAMPLE 2

The procedure of Example 2 is repeated except 0.5 weight percent of acetic acid is added to the OH terminated dimethylpolysiloxane used in Example 1. The resultant product has a silanol content of 0.2 weight percent. The silanol concentration was reduced 9.1 %, the same degree of reduction as when neat disilanol is heated, as in Example 1. This example shows that acetic acid effected less than a 25% change in silanol content.

COMPARISON EXAMPLE 3

The procedure of Example 2 is repeated except 0.5 weight percent of concentrated hydrochloric acid is added to the OH terminated dimethylpolysiloxane used in Example 1. The resultant product has a viscosity of 50,000 cSt. and a silanol content of about 0.04 weight percent. The silanol content is reduced 83 percent. This example shows that the hydrochloric acid does effect the condensation of the silanol terminated dimethylpolysiloxane.

COMPARISON EXAMPLE 4

The linear OH terminated dimethylpolysiloxane, having a viscosity of about 556 cSt shown in Comparison Example 1 is reacted with methyltrimethoxysilane in the presence of concentrated hydrochloric acid. 1984.2 parts of the silanol terminated fluid, 5.8 parts of methyltrimethoxysilane and 10 parts of concentrated hydrochloric acid are heated at 150° C. for six hours. The methanol byproduct, 1.9 parts, is distilled from the system. The system is vented to a bubbler containing silicone fluid and nitrogen. The nitrogen is slowly passed through the system, after the condenser. Additional volatile constituents, 3.8 parts, are removed at less than one torr at 175° C. for two hours. The resultant silanol-terminated dimethylpolysiloxane has a viscosity of 5706 cSt, a T content of 0.0211 weight percent and a silanol content of 0.08 weight percent determined by NMR. The intended ("theoretical") silanol content is 0.109 weight percent.

The mol ratio of the measured silanol to mols of branched compound per molecule in the final composition is calculated by dividing (1) the weight percent OH by the mol weight of Si-bonded OH (17), and by dividing (2) the weight percent of the content of the branched compound, T, by the mol weight for T (67). The result of (1) is then divided by result of (2). The calculation is (0.0008/17)/(0.000211/67)= 14.94285=M.

The intended structure is:

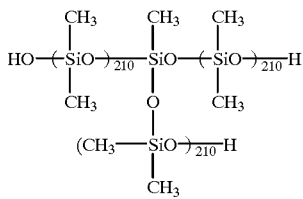

where b=3 and c=1. The range of M should be within 4.8–2.25. M is clearly not within this range for this example. L is determined by the intended structure. Here y is 3 and x is 1. L=2x+1 and is 3. Three mols of silanol terminated dimethylpolysiloxane a re used per one mol of silicon containing compound, methyltrimethoxysilane.

The percent of the intended silanol is calculated by dividing the measured silanol (0.08%) by the theoretical silanol content (0.109%). 73.4 percent of the intended silanol content is obtained. The percent of intended branching sites is calculated by dividing the measured T content (0.000211) by the theoretical T content (0.0014). Only 15.1 percent of intended branching sites are obtained.

COMPARISON EXAMPLE 5

The procedure of Example 2 is repeated except 0.5 weight percent of lithium hydroxide is added to the OH terminated dimethylpolysiloxane used in Comparison Example 1. The resultant product has a viscosity of 5577.4 cSt. The silanol content is 0.07 weight percent. This example shows that the lithium silanoate catalysis does effect the condensation of the silanol terminated dimethylpolysiloxanes.

Thus, preferred compositions are those wherein organyloxy-functional organosilicon compound (a) is a tri(organyloxy)monosilane, the minimally disilanol-functional organopolysiloxane is an α,ω-dihydroxypolyorganosiloxane, and wherein one the following conditions are met: a) the mol ratio of tris(organyloxy)monosilane to disilanol-functional organopolysiloxane is about 1:3 and the product contains a majority of molecules having three silanol-terminated polydiorganosiloxane branches; b) the mol ratio of tris(organyloxy)monosilane to disilanol-functional organopolysiloxane is about 2:5 and the product contains a majority of molecules having four silanol-terminated polydiorganosiloxane branches; c) the mol ratio of tris(organyloxy)monosilane to disilanol-functional organopolysiloxane is about 3:7 and the product contains a majority of molecules having five silanol-terminated polydiorganosiloxane branches.

COMPARISON EXAMPLE 6

A linear OH terminated dimethylpolysiloxane shown in Comparison Example 1 is reacted with methyltrimethoxysilane in the presence of lithium hydroxide. 1987.2 parts of the silanol-terminated fluid, 0.29 parts of methyltrimethoxysilane and 2 parts of lithium hydroxide are heated at 150° C. for six hours. The methanol byproduct is distilled from the system. Acetic acid 5 parts are added at room temperature and the resultant solid is removed by filtration. The system is vented to a bubbler containing silicone fluid and nitrogen. The nitrogen is slowly passed through the system, after the condenser. Additional volatile constituents are removed at less than one torr at 175° C. for two hours. The resultant silanol terminated dimethylpolysiloxane has a viscosity 6054.4 cSt, a T content of 0.1090 weight percent and a silanol content of 0.07 weight percent, determined by NMR. The intended silanol content is 0.109 weight percent.

The mol ratio of the measured silanol to mols of branched compound per molecule in the final composition is calculated as M=(0.0006/17)/(0.00109/67)=2.169455.

The intended structure is:

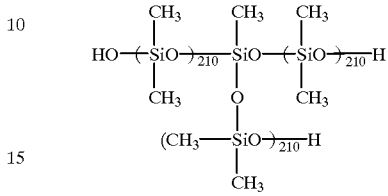

where b=3 and c=1. The acceptable range for M is 4.8–2.25. The value of M obtained is not within this range. L is determined by the intended structure, y is 3 and x is 1. L=2x+1 and is 3. Three mols of silanol terminated dimethylpolysiloxane are used per one mol of silicon containing compound, methyltrimethoxysilane.

The percent of the intended silanol is calculated by dividing the measured silanol (0.07%) by the theoretical silanol content (0.109%). Only 64 percent of the intended silanol content is obtained.

The percent of intended branching sites is calculated by dividing the measured T content (0.001090) by the theoretical T content (0.0014). 77.9 percent of intended branching sites are obtained. This examples shows that lithium silanoate is not a satisfactory catalyst for making silanol terminated branched dimethylpolysiloxanes.

EXAMPLE 1

A linear OH terminated dimethylpolysiloxane, having a viscosity of about 556 cSt, represented by the formula:

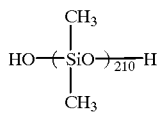

is reacted with methyltrimethoxysilane in the presence of acetic acid. 15873.8 parts of the silanol terminated fluid, 46.6 parts of methyltrimethoxysilane and 79.6 parts of acetic acid are heated at 150° C. for six hours. The methanol byproduct, 12.5 parts, is distilled from the system. The system is vented to a bubbler containing silicone fluid and nitrogen. The nitrogen is slowly passed through the system, after the condenser. Additional volatile constituents, 68 parts, are removed at less than one torr at 175° C. for two hours. The resultant branched, silanol-terminated dimethylpolysiloxane has a viscosity of 1413 cSt, a T content of 0.1224 weight percent and a silanol content of 0.13 weight percent, determined by NMR. The intended silanol content is 0.109 weight percent.

The mol ratio of the measured silanol to mols of branched compound per molecule in the final composition (M) is calculated to be 4.186.

The intended structure is the same as the intended structure for Comparison Examples 4 and 6, where b=3 and c=1. The value of M obtained is within the expected range of 4.8 to 2.25. L is determined by the intended structure. Y is 3 and X is one. L=2x+1 and is 3. Three mols of silanol terminated dimethylpolysiloxane are used per one mol of silicon containing compound, methyltrimethoxysilane.

The percent of the intended silanol is calculated by dividing the measured silanol (0.12%) by the theoretical silanol content (0.109%). 110 percent of the intended silanol content is obtained.

The percent of intended branching sites is calculated by dividing the measured T content (0.001224) by the theoretical T content (0.0014). 87.4 percent of intended branching sites are obtained. Note that, in contrast with Comparison Examples 4 and 6, a relatively low viscosity product is obtained.

EXAMPLE 2

The procedure of Example 1 is repeated except the nitrogen flow is increased through the system. The silanol content is found to be 0.107 weight percent and the T content is found to be 0.12 weight percent. The silanol terminated branched dimethylpolysiloxane has a viscosity of 1900 cSt. The intended silanol content is 0.109 percent.

The mol ratio of the intended silanol to mols of branched compound per molecule in the final composition is 3.445, well within the acceptable range.

The percent of intended branching sites is calculated by dividing the measured T content (0.0012) by the theoretical T content (0.0014). 87.4 percent of intended branching sites are obtained.

The percent of the intended silanol is calculated by dividing the measured silanol (0.107%) by the theoretical silanol content (0.109%). 85.7 percent of the intended silanol content is obtained. Not only is the viscosity much lower than for Comparison Examples 4 and 6, both the theoretical silanol content and theoretical branching content are high as well.

EXAMPLE 3

The procedure of example 1 is repeated with the same raw materials. However, the intended structure is to include two of the organyloxy compound-derived moieties. The organyloxy containing compound, methyltrimethoxysilane, contains three branching sites. The mols of silanol terminated dimethylpolysiloxane that are used are calculated using the formula $L=(y-1)(x)+1$, where y is 3, and x is 2. Thus, L, the number of mols of silanol, is 5.

Specifically, 1983.1 grams of the silanol-terminated dimethylpolysiloxane described in example 1, 7 grams of methyltrimethoxysilane and 10 grams of acetic acid are used. A silanol terminated branched dimethylpolysiloxane containing 0.1366 weight percent of T, 0.11 weight percent silanol and having a viscosity of 1204 cSt. is prepared.

The silanol content is found to be 0.133 weight percent and the T content is found to be 0.137 weight percent. The theoretical OH content is 0.11 weight percent.

The mol ratio of the measured silanol to mols of branched compound per molecule in the final composition, (M), is 3.82.

Since b=5 and c=2, M should range between 4.0–1.875.

The percent of the intended silanol is calculated by dividing the measured silanol (0.133%) by the theoretical silanol content (0.11%). As a result, 121 percent of the intended silanol content is obtained.

The percent of intended branching sites is calculated by dividing the measured T content (0.00137) by the theoretical T content (0.001723). 79.5 percent of intended branching sites are obtained. The low viscosity is particularly noteworthy.

EXAMPLE 4

The linear silanol terminated dimethylpolysiloxane used in Example 1 is reacted with methyltriacetoxysilane. 497.7 parts of the silanol-terminated fluid, 2.35 parts of methyltriacetoxysilane, and heated at 150° C. for six hours. The acetic acid by-product is distilled from the system. The system is vented to a bubbler containing silicone fluid and nitrogen. The nitrogen is slowly passed through the system, after the condenser. Additional volatile constituents are removed at less than one torr at 175° C. for two hours. The resultant branched silanol terminated dimethylpolysiloxane has a T content of 0.1504 weight percent and a silanol content of 0.102 weight percent is determined by NMR. The intended silanol is 0.109 weight percent. The mol ratio of the measured silanol to mols of branched compound per molecule in the final composition (M) is calculated to be 2.673.

The intended structure is the same as that intended for Comparison Examples 4 and 6, where b=3 and c=1, giving and acceptable range for M of 4.8–2.25. The product value of M is within this range.

The percent of the intended silanol is calculated by dividing the measured silanol (0.102%) by the theoretical silanol content (0.109%). 93.5 percent of the intended silanol content is obtained.

The percent of intended branching sites is calculated by dividing the measured T content (0.001504) by the theoretical T content (0.0014). 107.4 percent of intended branching sites are obtained.

By the term "major" as used herein is meant 50% or more by weight or by mol, or by whatever measure the percent is relative to, when the mixture contains but two components, and when the mixture contains more than two components, as in a reaction mixture containing numerous product molecules of varying formula, "major" refers to the fraction of molecules of a given type or class which are more numerous in mol fraction than any other type or class of molecules.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the preparation of branched organosilicon compounds having on average three or more ω-silanol-terminated, substantially linear organopolysiloxane branches per molecule, said process comprising reacting a) an organyloxy-functional compound having y organyloxy groups per molecule wherein y≧3, with b) from about 75 mol percent to about 125 mol percent of L/x mols per mol of organyloxy-functional compound of minimally disilanol-functional organopolysiloxanes compound containing 6 or more siloxy moieties, L calculated from $$L=(y-1)(x)+1$$

where y has been defined previously and x is the number of organyloxy compound-derived moieties in said product molecules on average, said reacting taking place until the mol ratio M of measured silanol to branched groups is in the range of $$(a)\cdot(b/c)$$

where a is in the range of about 0.75≦a≦1.6, b is the intended mol of silanol per gram of product, and c is the mol of branched groups per gram of product.

2. The process of claim 1 wherein said organyloxy groups are selected from alkoxy groups, acyl groups, and mixtures thereof.

3. The process of claim 2 wherein said organyloxy groups are selected from the group consisting of methoxy, ethoxy, acetoxy, and propionoyl groups and mixtures thereof.

4. The process of claim 1 wherein said minimally disilanol-functional organopolysiloxane is an optionally substituted α,ω-dihydroxyorganopolysiloxane.

5. The process of claim 4 wherein said α,ω-dihydroxyorganopolysiloxane is an α,ω-dihydroxypolydimethylsiloxane having from about 6 to about 10,000 repeating dimethylsiloxy units.

6. The process of claim 1 wherein said minimally disilanol-functional organopolysiloxane comprises a substantially linear, minimally disilanol-functional organopolysiloxane containing less than 5 mol percent of the total of T and Q groups.

7. The process of claim 1 wherein said organyloxy-functional organosilicon compound is an organosilicon compound having 1 to 5 silicon atoms.

8. The process of claim 7 wherein said organosilicon compound is an organyloxy-functional silane, silalkylene, or siloxane.

9. The process of claim 7 wherein said organyloxy-functional organosilicon compound is selected from monosilanes bearing three or four organyloxy groups selected from methoxy, ethoxy, and acetoxy groups.

10. The process of claim 1 wherein said reacting takes place in the presence of an effective amount of a differential catalyst.

11. The process of claim 1 wherein said reacting takes place in the presence of an effective amount of acetic acid catalyst.

12. A star and/or comb branched polyorganosiloxane, prepared by the process of claim 1.

13. A process for preparing branched organosilicon compounds having minimally three branches, the branches comprising substantially linear, silanol-terminated organopolysiloxane polymers containing six or more siloxy moieties, said process comprising:

a) selecting one or more organyloxy-functional organosilicon compounds having, on average, y organyloxy groups per molecule wherein y≧3;

b) reacting with the organyloxy-functional silicon compounds a) L/x mol of one or more minimally disilanol-functional organopolysiloxanes per mol of organyloxy-functional compound, where x is the desired number of organyloxy-functional organosilicon compound-derived moieties in the branched organosilicon compound product, and L=(y−1)x+1;

c) obtaining a product mixture comprising in major part star-and/or comb-branched product organopolysiloxanes having a functionality of silanol-terminated branches of 2L−yx.

14. The process of claim 13 wherein said reaction is accelerated by addition of an effective amount of a differential catalyst.

15. The process of claim 14 wherein said differential catalyst comprises acetic acid.

16. The process of claim 13 wherein said organyloxy-functional organosilicon compound (a) is a tri(organyloxy)monosilane, the minimally disilanol-functional organopolysiloxane is an α,ω-dihydroxypolyorganosiloxane, and wherein one of the following conditions is met:

a) the mol ratio of tris(organyloxy)monosilane to disilanol-functional organopolysiloxane is about 1:3 and the product contains a majority of molecules having three silanol-terminated polydiorganosiloxane branches;

b) the mol ratio of tris(organyloxy)monosilane to disilanol-functional organopolysiloxane is about 2:5 and the product contains a majority of molecules having four silanol-terminated polydiorganosiloxane branches;

c) the mol ratio of tris(organyloxy)monosilane to disilanol-functional organopolysiloxane is about 3:7 and the product contains a majority of molecules having five silanol-terminated polydiorganosiloxane branches.

17. The process of claim 13 wherein said organyloxy-functional organosilicon compound (a) is a tri(organyloxy)monosilane, the minimally disilanol-functional organopolysiloxane is an α,ω-dihydroxypolyorganosiloxane, and wherein the following conditions are met:

the mol ratio of tris(organyloxy)monosilane to disilanol-functional organopolysiloxane is {(y−1)x+1}/x and the product contains a majority of molecules having integral numbers of silanol functionalities, which integral numbers are the integers immediately greater than and immediately less than y+x(y−2) when y+x(y−2) is itself not a whole number.

18. The polyorganosiloxane of claim 17 wherein at least 75 mol percent of hypothetical branch points have formed branches of ω-silanol-terminated, substantially linear organopolysiloxane.

19. A composition, prepared in accordance with claim 1, containing a major amount of one or more branched polyorganosiloxane selected from the group consisting of:

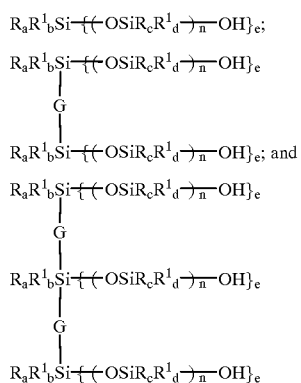

where R is $C_{1-18}$ saturated hydrocarbon radical, $R^1$ is an unsaturated hydrocarbon radical, wherein R and $R^1$ may individually contain interspersed heteroatom-containing linking groups, G is —O—, —$R^2$— or $-(SiR_2O)_m$ where $R^2$ is a $C_{1-18}$ hydrocarbon diradical optionally containing interspersed heteroatom-containing linking groups, a and b are 0, 1, or 2, c and d are 0, 1, or 2, and the sum of c+d is 2, e is 0, 1, 2, or 3, n is an integer which on average is from 6 to 10,000, and the total of R, $R^1$, G, and

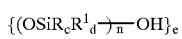

groups bonded to each silicon atom is 4, and a, b, and e are such that the sum of all e in each branched organopolysiloxane is minimally 3, and wherein m is an integer from 1 to 10,000.

* * * * *